(12) United States Patent
Depraete

(10) Patent No.: US 10,072,746 B2
(45) Date of Patent: Sep. 11, 2018

(54) STATOR ASSEMBLY OF HYDROKINETIC TORQUE CONVERTER, AND METHOD FOR MAKING THE SAME

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 332 days.

(21) Appl. No.: 14/704,263

(22) Filed: May 5, 2015

(65) Prior Publication Data

US 2016/0327141 A1 Nov. 10, 2016

(51) Int. Cl.
*F16H 41/28* (2006.01)
*F16H 41/24* (2006.01)

(52) U.S. Cl.
CPC .............. *F16H 41/24* (2013.01); *F16H 41/28* (2013.01); *F16H 2041/285* (2013.01)

(58) Field of Classification Search
CPC ..... F16H 41/24; F16H 41/28; F16H 2041/285
USPC ...................................... 415/209.4
See application file for complete search history.

(56) References Cited

U.S. PATENT DOCUMENTS

| | | | | |
|---|---|---|---|---|
| 2,335,091 A | * | 11/1943 | Utz | F16H 41/28 29/889.21 |
| 2,598,620 A | | 5/1952 | Swift | |
| 2,945,673 A | * | 7/1960 | Hockert | F01D 9/042 415/139 |
| 3,749,512 A | * | 7/1973 | Miller | F01D 25/24 415/136 |
| 4,643,636 A | * | 2/1987 | Libertini | F01D 5/284 415/138 |
| 5,069,265 A | * | 12/1991 | Blazek | B22C 9/04 164/10 |
| 5,174,715 A | * | 12/1992 | Martin | B23P 15/006 29/464 |
| 5,332,360 A | * | 7/1994 | Correia | F01D 9/042 29/889.21 |
| 5,474,419 A | * | 12/1995 | Reluzco | F01D 9/044 415/209.4 |
| 5,494,404 A | * | 2/1996 | Furseth | F01D 9/042 415/209.3 |
| 6,547,518 B1 | * | 4/2003 | Czachor | F01D 9/044 415/137 |
| 7,761,990 B2 | * | 7/2010 | Ellis | B23P 6/005 29/889.1 |

(Continued)

FOREIGN PATENT DOCUMENTS

GB 706752 A 4/1954
JP S5013911 A 2/1975

*Primary Examiner* — Aaron R Eastman
(74) *Attorney, Agent, or Firm* — Berenato & White, LLC

(57) ABSTRACT

A stator of a hydrokinetic torque converter comprises a stator hub having an axis, a stator belt coaxial to the axis and a plurality of stator blades extending radially outwardly between the stator hub and the stator belt. Each of the stator blades has radially inner and outer mounting pins. The stator hub has hub slots, and the stator belt has belt slots. The radially inner mounting pin of one of the stator blades is disposed in one of the hub slots of the stator hub and the radially outer mounting pin of one of the stator blades is disposed in one of the belt slots of the stator belt.

19 Claims, 9 Drawing Sheets

(56) References Cited

U.S. PATENT DOCUMENTS

| | | | |
|---|---|---|---|
| 7,914,255 B2 * | 3/2011 | Workman | F01D 9/042 |
| | | | 29/889.22 |
| 2003/0113204 A1 * | 6/2003 | Wolf | F01D 17/162 |
| | | | 415/165 |
| 2007/0140841 A1 | 6/2007 | George et al. | |
| 2007/0224042 A1 * | 9/2007 | Brees | F04D 29/542 |
| | | | 415/208.2 |
| 2008/0149453 A1 * | 6/2008 | Brees | F16D 41/185 |
| | | | 192/41 R |
| 2009/0232655 A1 * | 9/2009 | Brees | B23K 1/0008 |
| | | | 416/180 |
| 2012/0193182 A1 * | 8/2012 | Gurney | B23P 11/005 |
| | | | 192/46 |
| 2014/0356137 A1 * | 12/2014 | Zaugg | F16H 41/24 |
| | | | 415/146 |
| 2017/0022829 A1 * | 1/2017 | Freeman | F01D 9/02 |

\* cited by examiner

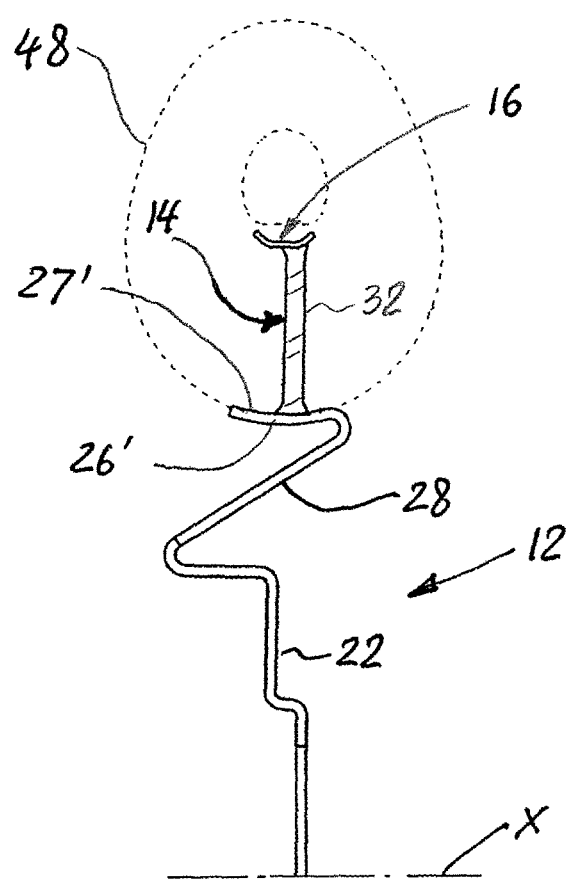

STATOR ASSEMBLY OF HYDROKINETIC TORQUE CONVERTER, AND METHOD FOR MAKING THE SAME

BACKGROUND OF THE INVENTION

1. Field of the Invention

This invention generally relates to hydrokinetic torque converters in general, and more particularly, to a stator assembly for a hydrokinetic torque converter and a method for making the same.

2. Description of the Related Art

Typically, a hydrokinetic torque converter includes a drive pump (or impeller), a driven turbine, a stator (sometimes referred to as the reactor). The stator (or stator assembly) is positioned between the impeller and turbine to redirect hydraulic work fluid from the turbine back to the impeller in an efficient manner. The stator is typically mounted on a one-way clutch to prevent the stator from counter-rotation. Thrust bearings are interposed between side bearing rings of the stator and the impeller and the turbine.

The turbine is operatively connected with a hub linked in rotation to a driven shaft, which is itself linked to an input shaft of a transmission of a vehicle. The turbine works together with the impeller, which is linked in rotation to a casing that is linked in rotation to a driving shaft driven by an internal combustion engine. The stator is interposed axially between the turbine and the impeller, and is mounted so as to rotate on the driven shaft with the interposition of the one-way clutch. Typically, the stator is made by a single-piece casting or molding.

Typically, the stator is a single-piece body made of aluminum by die casting. Various machining processes also required to be added to the stator body. As typical stators are made by die casting from aluminum, the cost is relatively high as aluminum is expensive material, and die casting tool is complex to design and costly. Moreover, the typical process of making stators constrains design options.

While conventional stators of the hydrokinetic torque converters, including but not limited to that discussed above, have proven to be acceptable for vehicular driveline applications and conditions, improvements that may enhance their performance and cost are possible. The need therefore exists for a stator for a hydrokinetic torque converter that is lighter, simple in design, compact in construction and economical to package and manufacture, improves stator blade design flexibility for hydrodynamic performance (allows blade overlap, allows radial/angular shape for stator hub and stator belt thanks to no axial pulling requirement), and does not use complex and expansive die casting tool.

BRIEF SUMMARY OF THE INVENTION

According to a first aspect of the invention, there is provided a stator assembly for a hydrokinetic torque converter. The stator assembly comprises a stator hub having an axis, a stator belt coaxial to the axis, and a plurality of stator blades extending radially outwardly between the stator hub and the stator belt. Each of the stator blades has a radially inner mounting pin and a radially outer mounting pin. The stator hub has a plurality of hub slots. The stator belt has a plurality of belt slots. The radially inner mounting pin of one of the plurality of the stator blades is disposed in one of the hub slots of the stator hub, and the radially outer mounting pin of one of the plurality of the stator blades is disposed in one of the belt slots of the stator belt.

According to a second aspect of the present invention, there is provided a method for making a stator assembly of a hydrokinetic torque converter. The method involves the steps of forming a stator hub having an axis, forming a metal strip, providing a plurality of stator blades, non-rotatably securing the stator blades to the stator hub at radially inner ends of the stator blades, deforming the metal strip to a substantially annular shaped deformed metal strip so that free opposite distal ends of the metal strip are positioned adjacent to each other, and non-rotatably securing the stator blades to the deformed metal strip at radially outer ends of the stator blades.

Other aspects of the invention, including apparatus, devices, systems, converters, processes, and the like which constitute part of the invention, will become more apparent upon reading the following detailed description of the exemplary embodiments.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 5B is a cross-sectional view of the stator assembly according to an alternative embodiment of the present invention;

Figure 1:
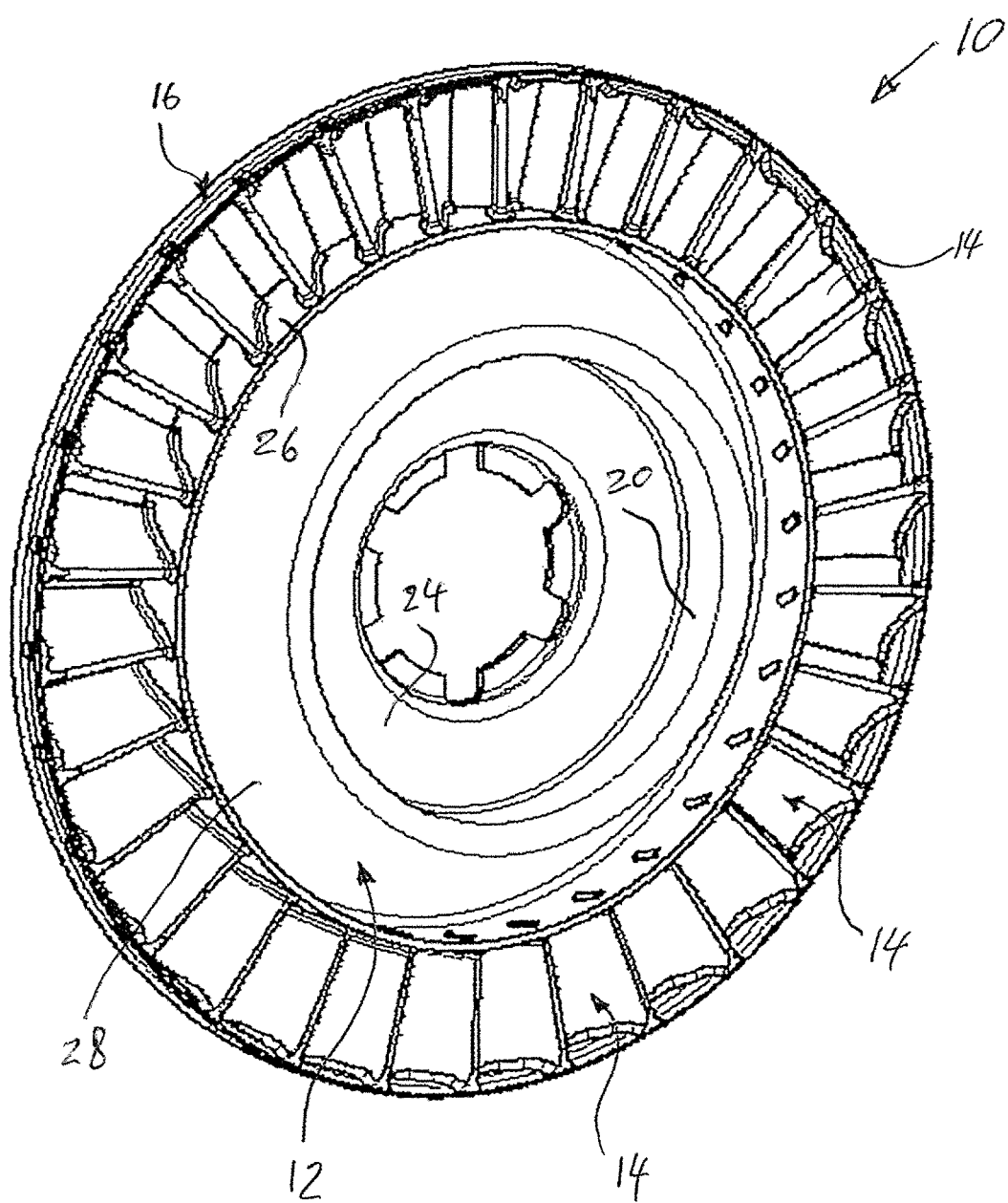
FIG. 1 is a perspective view of a stator assembly in accordance with an exemplary embodiment of the present invention.
Figure 2:
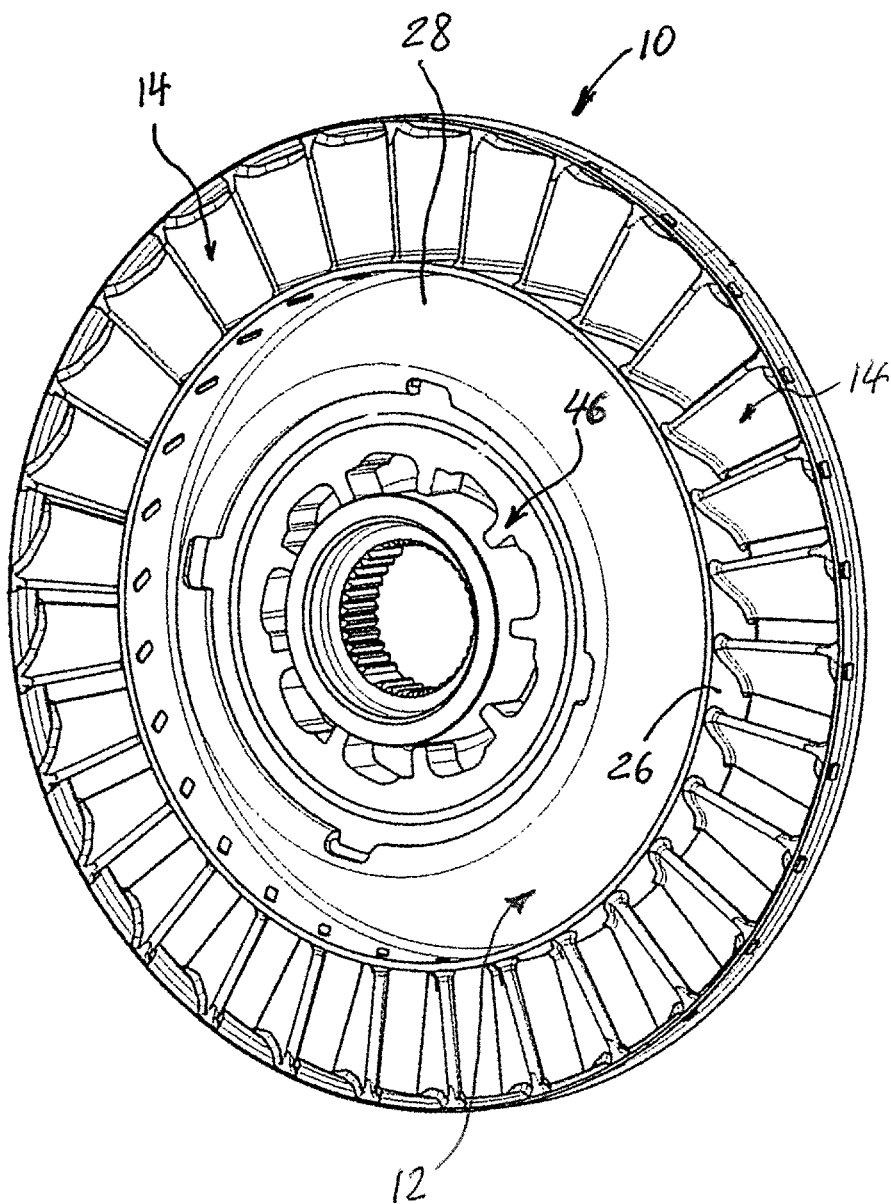
FIG. 2 is a perspective view of the stator assembly in accordance with the exemplary embodiment of the present invention with a one-way clutch mounted thereon.
Figure 3:
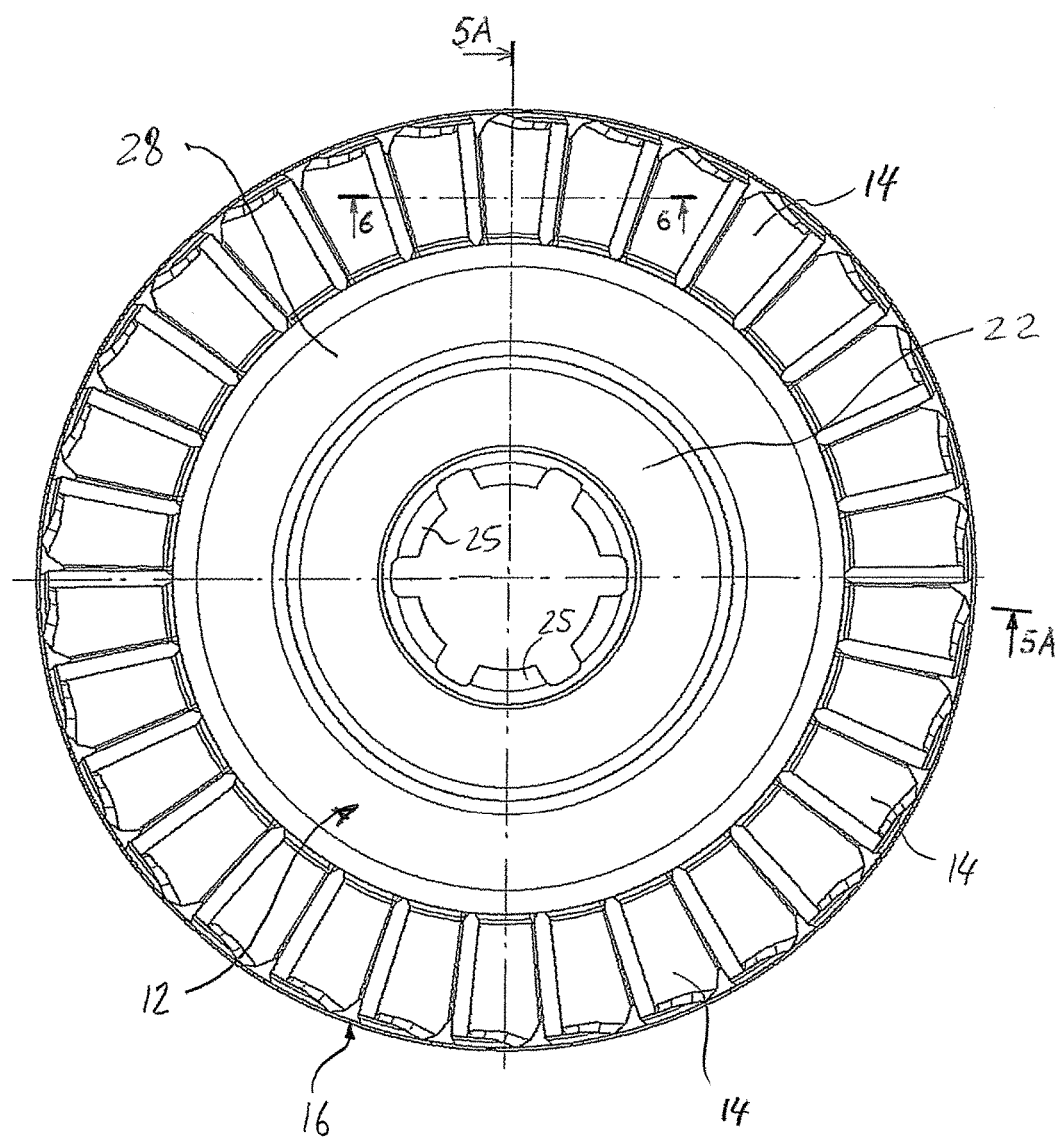
FIG. 3 is a front view of the stator assembly in accordance with the exemplary embodiment of the present invention.
Figure 4:
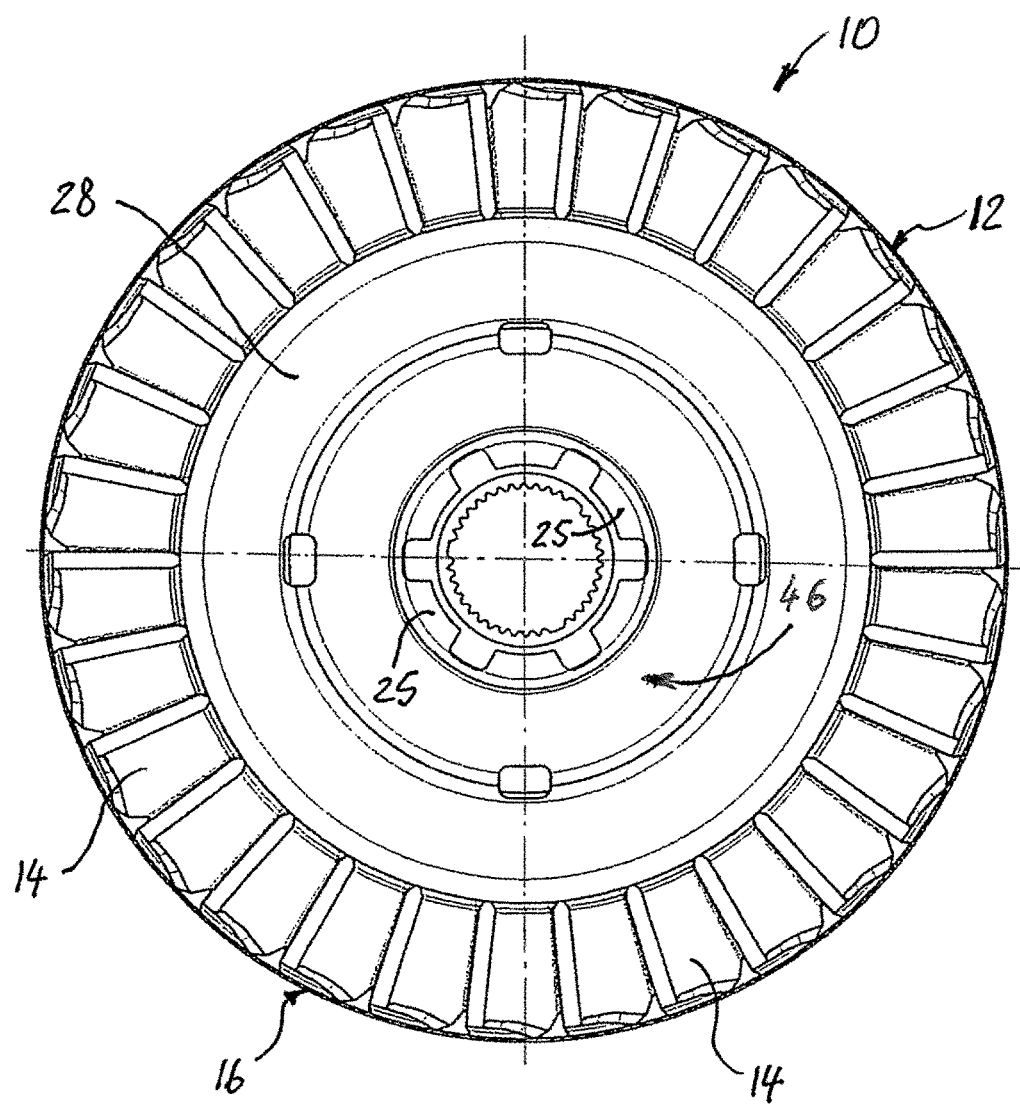
FIG. 4 is a front view of the stator assembly in accordance with the exemplary embodiment of the present invention with the one-way clutch mounted thereon.

DETAILED DESCRIPTION OF EXEMPLARY EMBODIMENTS AND EMBODIED METHODS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one" and the word "two" as used in the claims means "at least two".

A stator assembly according to the exemplary embodiment of the present invention, suitable for use in a hydrokinetic torque converter, is generally represented in the accompanying drawings by reference numeral 10, as best shown in FIGS. 1-4. The stator assembly 10 is typically mounted between an impeller (not shown) and a turbine (not shown) of the torque converter. A one-way (or overrunning) clutch 46 is disposed between the stator 10 and a stator shaft (not shown) and permits rotation of the stator assembly 10 in one direction only.

The stator assembly 10 is rotatable about an axis of rotation X and comprises a substantially annular stator hub 12 coaxial to the axis X, a plurality of stator blades (or vanes) 14 extending radially outwardly from the stator hub 12, which is located radially inwardly and central to the stator blades 14, and a substantially annular stator belt 16 mounted to the stator blades 14 so that the stator blades 14 extend radially between the stator hub 12 and the stator belt 16. The stator belt 16 is located outside the stator hub 12.

Herein, the axial and radial orientations (or directions) are considered with respect to the axis X of the stator assembly 10. The relative terms such as "axially," "radially," and "circumferentially" are with respect to orientations parallel to, perpendicular to, and circularly around the axis X, respectively.

Figure 5A:
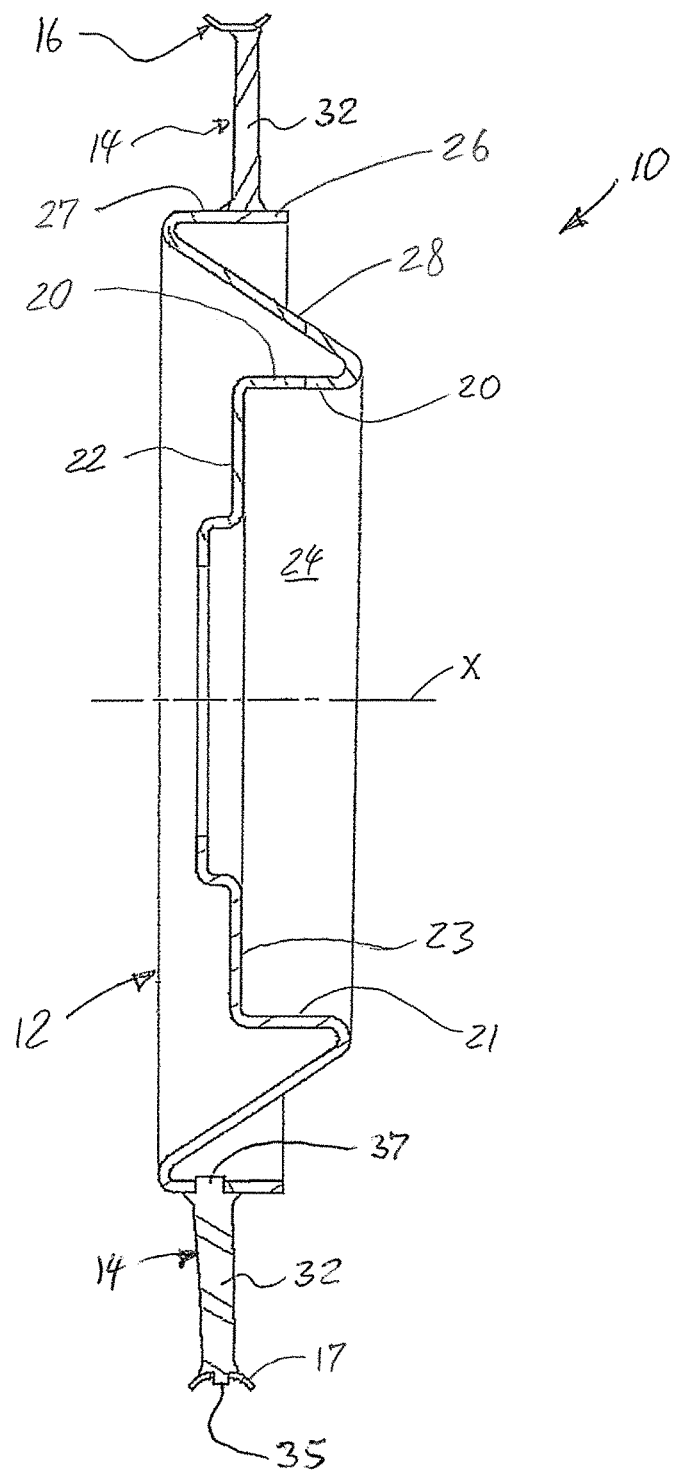
FIG. 5A is a cross-sectional view of the stator assembly according to the exemplary embodiment of the present invention taken along the lines 5A-5A in FIG. 3.
Figure 7:
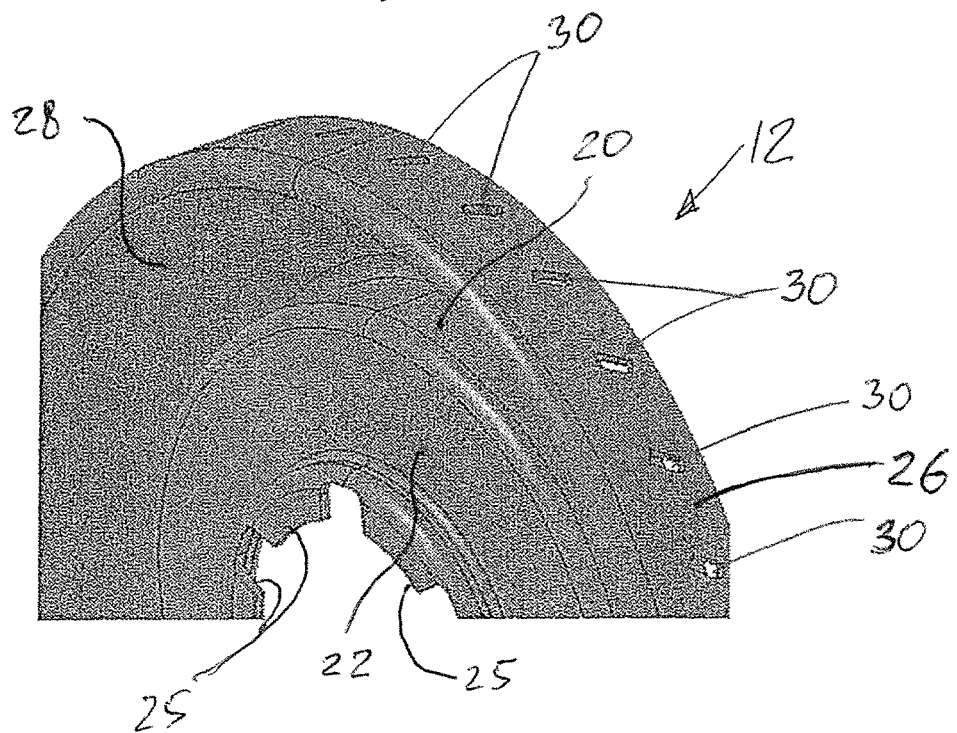
FIG. 7 is partial perspective view of a stator hub of the stator assembly in accordance with the exemplary embodiment of the present invention.

As best shown in FIGS. 5A and 7, the stator hub 12 includes a substantially annular base rim 20 coaxial to the axis X, and a transverse wall 22 integral with the base rim 20 and extending radially inwardly from the base rim 20 so as to define a substantially cylindrical hub bore 24 coaxial with the axis X. The hub bore 24 within the stator hub 12 is delimited by a cylindrical inner peripheral surface 21 of the base rim 20 and a substantially annular inner transverse surface 23 of the transverse wall 22. The cylindrical inner peripheral surface 21 of the base rim 20 extends substantially coaxially to the axis X, while the inner transverse surface 23 of the transverse wall 22 extend substantially perpendicular to the axis X. The hub bore 24 within the stator hub 12 houses the one-way clutch 46 of the hydrokinetic torque converter (not shown).

The transverse wall 22 includes one or more support tabs 25 extending radially inwardly from the transverse wall 22 and axially offset therefrom. The transverse wall 22 of the stator hub 12 with the support tabs 25 is configured to prevent axial movement of components of the one-way clutch 46 of the hydrokinetic torque converter in the direction of the axis X relative to the stator hub 12.

The stator hub 12 further includes a substantially annular outer rim 26 coaxial with the axis X, and a connection wall 28 extending radially outwardly from the base rim 20 toward the outer rim 26 and integrally connecting the base rim 20 to the outer rim 26. According to the exemplary embodiment of the present invention, the stator hub 12 is made of a sheet metal material, such as carbon steel, by stamping as a single-piece part. As best shown in FIG. 5A, the annular outer rim 26 of the stator hub 12 has a substantially cylindrical (i.e., straight in the axial direction) radially outer surface 27 of the outer rim 26. Alternatively, as best shown in FIG. 5B, an annular outer rim 26' of the stator hub 12 has a curved, concave (in the axial direction) radially outer surface 27'. The curvature of the concave annular outer rim 26' is selected so as to optimize the shape for fluid flow and to follow the curvature of a torus 48, as best shown in FIG. 5B. It results in a better flow efficiency and better hydrodynamic performance of the hydrokinetic torque converter.

As best shown in FIG. 7, the stator hub 12 has a plurality of hub slots (through holes) 30 formed through the outer rim 26 thereof. The hub slots 30 are circumferentially equidistantly spaced from one another. According to the exemplary embodiment of the present invention, the hub slots 30 in the outer rim 26 of the stator hub 12 are structurally and dimensionally identical. In the exemplary embodiment of the present invention, the hub slots 30 extend substantially obliquely with regards to an axis parallel to the axis of rotation X and which goes through the hub slots 30. In alternatively, the hub slots 30 could extend perpendicularly or parallel to the same axis.

Figure 8:
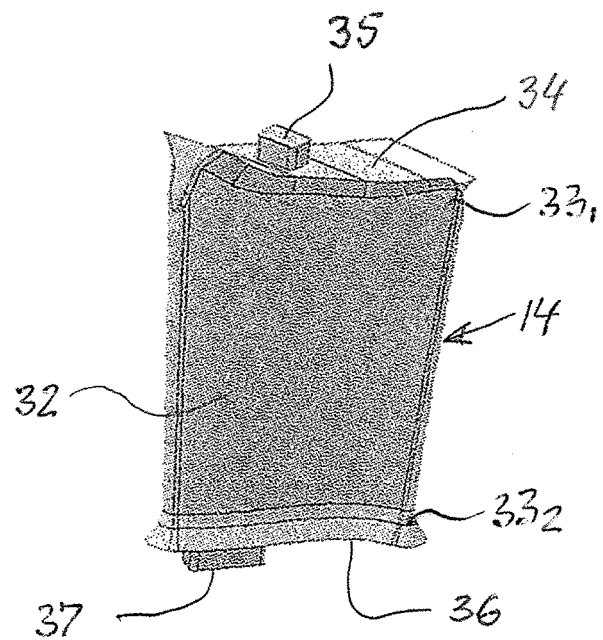
FIG. 8 is a perspective view of a stator blade of the stator assembly in accordance with the exemplary embodiment of the present invention.

Further according to the exemplary embodiment of the present invention, the stator blades 14 are structurally and dimensionally identical. As best shown in FIGS. 5A and 8, each of the stator blades 14 includes a curved blade body 32 having a radially outer (or first) end $33_1$ with a radially outer surface 34 juxtaposed to the stator belt 16, and a radially inner (or second) end $33_2$ with a radially inner surface 36 juxtaposed to the outer rim 26 of the stator hub 12. The radially outer surface 34 of the stator blades 14 is formed curved complementary to a radially inner surface 17 of the stator belt 16, while the radially inner surface 36 of the stator blades 14 is formed complementary to a radially outer surface 27 of the outer rim 26.

Moreover, each of the stator blades 14 further includes a radially outer mounting pin 35 extending substantially radially outwardly from the radially outer surface 34 of the radially outer end $33_1$ of the blade body 32 toward the stator belt 16, and a radially inner mounting pin 37 extending substantially radially inwardly from the radially inner surface 34 of the radially inner end $33_2$ of the blade body 32 toward the outer rim 26 of the stator hub 12. Alternatively, each of the stator blades 14 may include more than one radially outer mounting pin 35 extending substantially radially outwardly from the radially outer surface 34 of the blade body 32, and more than one radially inner mounting pin 37 extending substantially radially inwardly from the radially inner surface 34 of the blade body 32.

Furthermore, a number of the hub slots 30 formed through the outer rim 26 of the stator hub 12 correspond to a number of the radially inner mounting pins 37 of the stator blades 14. In an assembled condition of the stator assembly 10, the radially inner mounting pins 37 of the stator blades 14 are disposed in and extend through the hub slots 30 in the radial direction. Accordingly, the hub slots 30 are geometrically complementary to the corresponding radially inner mounting pins 37.

Figure 9:
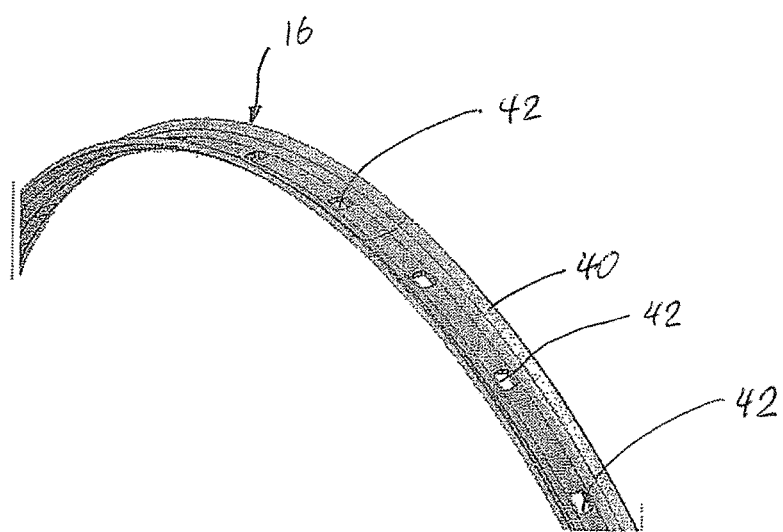
FIG. 9 is partial perspective view of a stator belt of the stator assembly in accordance with the exemplary embodiment of the present invention.

As best shown in FIGS. 5A and 9, the stator belt 16 includes a substantially annular belt body 40 having a plurality of belt slots (through holes) 42 formed therethrough. The belt slots 42 are circumferentially equidistantly spaced from one another. According to the exemplary embodiment of the present invention, the belt slots 42 in the belt body 40 of the stator belt 16 are structurally and dimensionally identical.

Furthermore, a number of the belt slots 42 formed through the belt body 40 of the stator belt 16 correspond to a number of the radially outer mounting pins 35 of the stator blades 14. In an assembled condition of the stator assembly 10, the radially outer mounting pins 35 of the stator blades 14 are disposed in and extend through the belt slots 42 in the radial direction. Accordingly, the belt slots 42 are geometrically complementary to the corresponding radially outer mounting pins 35. The belt slots 42 can be oriented substantially perpendicularly (as shown in FIG. 9) or obliquely with regards to an axis which is parallel to the axis of rotation X.

In order to retain the stator blades 14 in the appropriate, angularly non-moveable (i.e., non-rotatable) position relative to the stator hub 12, the radially inner mounting pins 37 and the corresponding hub slots 30 have non-circular cross-sections in the plane perpendicular to the radial direction, such as substantially rectangular, as best shown in FIGS. 7 and 8. Similarly, the radially outer mounting pins 35 and the corresponding belt slots 42 have non-circular cross-sections in the plane perpendicular to the radial direction, such as substantially rectangular, as best shown in FIGS. 8 and 9, in order to retain the stator blades 14 in the appropriate, angularly fixed (or non-rotatable) position relative to the stator belt 16. Therefore, the radially outer mounting pins 35/the belt slots 42 and the radially inner mounting pins 37/the hub slots 30 define an anti-rotation mechanism that prevents the rotation of the stator blades 14 relative to the stator hub 12 and the stator belt 16. It should be understood that the anti-rotation mechanism may undertake alternative forms.

Figure 6:
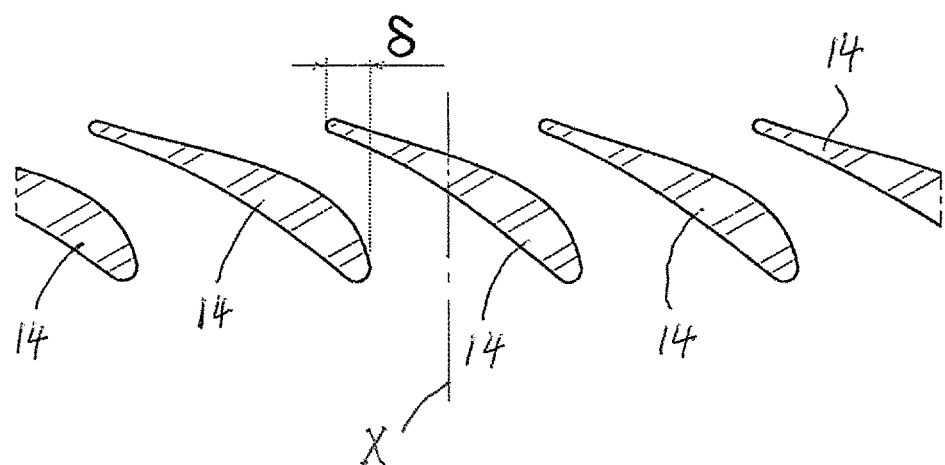
FIG. 6 is a cross-sectional view of the stator assembly according to the exemplary embodiment of the present invention taken along the lines 6-6 in FIG. 3.

The stator assembly 10 according to the present invention allows the stator blade overlap configuration that is not typically feasible. Specifically, as best shown in FIG. 6, the stator blades 14 partially overlap each other in the axial and circumferential directions. As shown in FIG. 6, the stator blades 14 overlap each other in the circumferential directions by an overlap amount δ between adjacent vanes 14. Such an overlapped stator blade arrangement allows a significant improvement in torque ratio and efficiency of the hydrokinetic torque converter.

Described below is an exemplary method whereby the stator assembly 10 of the hydrokinetic torque converter according to the exemplary embodiment of the present invention is manufactured. It should be understood that alternative methods may be practiced within the scope of the invention.

According to the embodied method, the stator hub 12 is made of a sheet metal material by stamping a blank of the sheet metal material to form a single-piece part defining the hub bore 24, the outer rim 26 and having an axis X. Then, the hub slots 30 are formed radially through the outer rim 26 of the stator hub 12 by any appropriate technique known in the art, such as by punching. Moreover, the hub slots 30 have non-circular cross-sections in the plane perpendicular to the radial direction, such as substantially rectangular, and are formed at equidistantly spaced apart locations on the outer rim 26.

Next, the stator belt 16 is made of a metal strip (or band). According with the exemplary embodiment of the present invention, the metal strip is made of steel, such as carbon steel, by metal rolling process. The belt slots 42 are formed at equidistantly spaced apart locations on the rolled steel band by any appropriate technique known in the art, such as by punching Then, the stator blades 14 are provided. As described above, each of the stator blades 14 is formed with the radially outer mounting pin 35 extending substantially radially outwardly from the radially outer surface 34 of the blade body 32, and the radially inner mounting pin 37 extending substantially radially inwardly from the radially inner surface 34 of the blade body 32. Both the radially outer mounting pin 35 and the radially inner mounting pin 37 of each of the stator blades 14 have non-circular cross-sections in the plane perpendicular to the radial direction, such as substantially rectangular. Moreover, the stator blades 14 are formed so that the belt slots 42 are geometrically complementary to the corresponding radially outer mounting pins 35, while the hub slots 30 are geometrically complementary to the corresponding radially inner mounting pins 37. The stator blades 14 are made by injection molding or die casting of light material, such as hard plastic, aluminum, magnesium, etc.

Subsequently, the stator blades 14 are angularly non-moveably (i.e., non-rotatably) mounted to the stator hub 12. Specifically, the radially inner mounting pin 37 of each of the stator blades 14 is inserted into and through one of the hub slots 30 through the outer rim 26 of the stator hub 12, as best shown in FIG. 5A.

Then, the rolled steel strip is deformed to a substantially annular shape, placed over the stator hub 12, and mounted to the stator blades 14 so that the radially outer mounting pin 35 of each of the stator blades 14 is inserted into and through one of the belt slots 42 in the rolled steel stator belt 16, thus angularly non-moveably (i.e., non-rotatably) mounting the stator blades 14 to the rolled steel band. As a result, free opposite distal ends of the rolled steel band are positioned adjacent to each other.

Next, the free opposite distal ends of the rolled steel band are welded together so as to form the substantially annular belt body 40 of the stator belt 16. It should be understood that alternative methods of connecting (or joining) the opposite distal ends of the rolled steel band may be practiced within the scope of the invention.

The one-way clutch 46 may be later mounted in the hub bore 24 of the stator hub 12.

Therefore, the present invention provides a novel stator assembly for a hydrokinetic torque converter and a method for making the same that reduces the size/packaging of the stator assembly and the cost of making the stator assembly by saving expensive material, such as aluminum, typically used for making the stator assembly. The novel method for making the stator assembly according to the present invention also allows new stator blade configuration and overlaps that are not typically feasible with current state of the art. This new stator blade arrangement allows a significant improvement in torque ratio and efficiency of the hydrokinetic torque converter, improves stator blade design flexibility for hydrodynamic performance by allowing blade overlap and radial/angular shape for stator hub and stator belt, and does not use complex and expansive die casting tool.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A stator assembly of a hydrokinetic torque converter, comprising:
   a stator hub, including a one-way clutch, and having an axis;
   a stator belt coaxial to the axis; and
   a plurality of stator blades extending radially outwardly between the stator hub and the stator belt, each of the stator blades having a radially inner mounting pin and a radially outer mounting pin;
   the stator hub having a plurality of hub slots;
   the stator belt having a plurality of belt slots;
   the radially inner mounting pin of one of the plurality of the stator blades disposed in one of the hub slots the stator hub and the radially outer mounting pin of one of the plurality of the stator blades disposed in one of the belt slots of the stator belt.

2. The stator assembly as defined in claim 1, wherein the plurality of the hub slots of the stator hub are complementary to the radially inner mounting pins of the stator blades; and wherein the plurality of the belt slots of the stator belt are complementary to the radially outer mounting pins of the stator blades.

3. The stator assembly as defined in claim 1, wherein the stator hub defines a cylindrical hub bore coaxial to the axis, the hub bore adapted to house the one-way clutch of the hydrokinetic torque converter.

4. The stator assembly as defined in claim 3, wherein the stator hub further includes an annular base rim coaxial to the axis X and a transverse wall integral with the base rim and extending radially inwardly from the base rim so as to define the cylindrical hub bore.

5. The stator assembly as defined in claim 4, wherein the hub bore within the stator hub is delimited by a cylindrical inner peripheral surface of the base rim and an annular inner transverse surface of the transverse wall.

6. The stator assembly as defined in claim 4, wherein the transverse wall includes at least one support tab extending radially inwardly from the transverse wall and axially offset therefrom; and wherein the at least one support tab is configured to prevent axial movement of components of the one-way clutch of the hydrokinetic torque converter in the direction of the axis X relative to the stator hub.

7. The stator assembly as defined in claim 4, wherein the stator hub further includes a connection wall extending radially outwardly from the base rim toward an outer rim and integrally connecting the base rim to the outer rim.

8. The stator assembly as defined in claim 1, wherein the radially inner mounting pins and the hub slots have non-circular cross-sections in the plane perpendicular to the radial direction; and wherein the radially outer mounting pins and the belt slots have non-circular cross-sections in the plane perpendicular to the radial direction.

9. The stator assembly as defined in claim 1, wherein the stator hub has an annular outer rim coaxial to the axis; wherein the stator belt has an annular belt body coaxial to the axis; wherein the stator blades extend radially outwardly between the outer rim of the stator hub and the belt body of the stator belt; wherein the hub slots are formed in the outer rim of the stator hub; and wherein the belt slots are formed in the belt body of the stator belt.

10. A method for making a stator assembly of a hydrokinetic torque converter, the method comprising the steps of:
    forming a stator hub having a bore and an axis;
    forming a metal strip;
    providing a plurality of stator blades;
    mounting the stator blades to the stator hub at radially inner ends of the stator blades;
    deforming the metal strip to an annular deformed metal strip so that free opposite distal ends of the metal strip are positioned adjacent to each other;
    mounting the deformed metal strip to the stator blades at radially outer ends of the stator blades ;
    joining the free opposite distal ends of the metal strip together so as to form an annular belt body of a stator belt; and,
    mounting a one-way clutch in the hub bore of the stator hub.

11. The method as defined in claim 10, further comprising the steps of:
    forming a plurality of hub slots in an annular outer rim of the stator hub, the outer rim of the stator hub coaxial to the axis;
    forming a plurality of belt slots in the metal strip; and
    forming the stator blades so that each of the stator blades having a radially inner mounting pin complementary to the hub slots and a radially outer mounting pin complementary to the belt slots.

12. The method as defined in claim 11, wherein the plurality of the hub slots in the outer rim of the stator hub are complementary to the radially inner mounting pins of the stator blades; and wherein the plurality of the belt slots are complementary to the radially outer mounting pins of the stator blades.

13. The method as defined in claim 12, wherein the radially inner mounting pins and the complementary hub slots have non-circular cross-sections in the plane perpendicular to the radial direction; and wherein the radially outer mounting pins and the complementary belt slots have non-circular cross-sections in the plane perpendicular to the radial direction.

14. The method as defined in claim 11, wherein the step of non-rotatably securing the stator blades to the stator hub includes the step of inserting the radially inner mounting pin of each of the stator blades into one of the hub slots; wherein the step of non-rotatably securing the deformed metal strip to the stator blades includes the step of inserting the radially outer mounting pin of each of the stator blades into one of the belt slots in the deformed metal strip so that free opposite distal ends of the metal strip are positioned adjacent to each other.

15. The method as defined in claim 10, wherein the stator hub is a single-piece part formed by stamping a blank of a sheet metal material.

16. The method as defined in claim 15, wherein the plurality of the hub slots are formed radially in the outer rim of the stator hub are formed by punching.

17. The method as defined in claim 10, wherein the metal strip is made by metal rolling.

18. The method as defined in claim 17, wherein the plurality of the belt slots are formed by punching.

19. The method as defined in claim 10, wherein the plurality of the stator blades are formed by molding or casting.

* * * * *